OR 3,910,675

United Sta[tes Patent]
MacGovern

[11] 3,910,675
[45] Oct. 7, 1975

[54] LASER SCANNING APPARATUS
[75] Inventor: Alan John MacGovern, Acton, Mass.
[73] Assignee: Itek Corporation, Lexington, Mass.
[22] Filed: Nov. 4, 1974
[21] Appl. No.: 520,762

[52] U.S. Cl. .................................. 350/7; 350/7
[51] Int. Cl.² .............................. H02B 27/17
[58] Field of Search ......................... 350/7, 6

[56] References Cited
UNITED STATES PATENTS
| | | | |
|---|---|---|---|
| 3,426,144 | 2/1969 | Roth | 350/7 |
| 3,523,160 | 8/1970 | Willey | 350/7 |
| 3,646,568 | 2/1972 | Woywood | 350/7 |
| 3,750,189 | 7/1973 | Fleischer | 350/7 |

Primary Examiner—John Kominski
Attorney, Agent, or Firm—Homer O. Blair; Robert L. Nathans; Gerald H. Glanzman

[57] ABSTRACT

Laser scanning apparatus providing a high duty cycle without sacrificing available laser energy. Scanning is effected by deflecting a laser beam off of the faces of a rotating polygonal or pyramidal deflector. Shearing structure in the form of prisms or shear plates is positioned in the path of the beam in advance of the deflector to shear the beam by amounts sufficient to maintain the beam fully on the particular deflector face moving across the beam for an increased length of time. By introducing the proper amount of shear into the beam, a duty cycle in excess of 90% is readily obtainable without sacrificing available laser energy.

14 Claims, 3 Drawing Figures

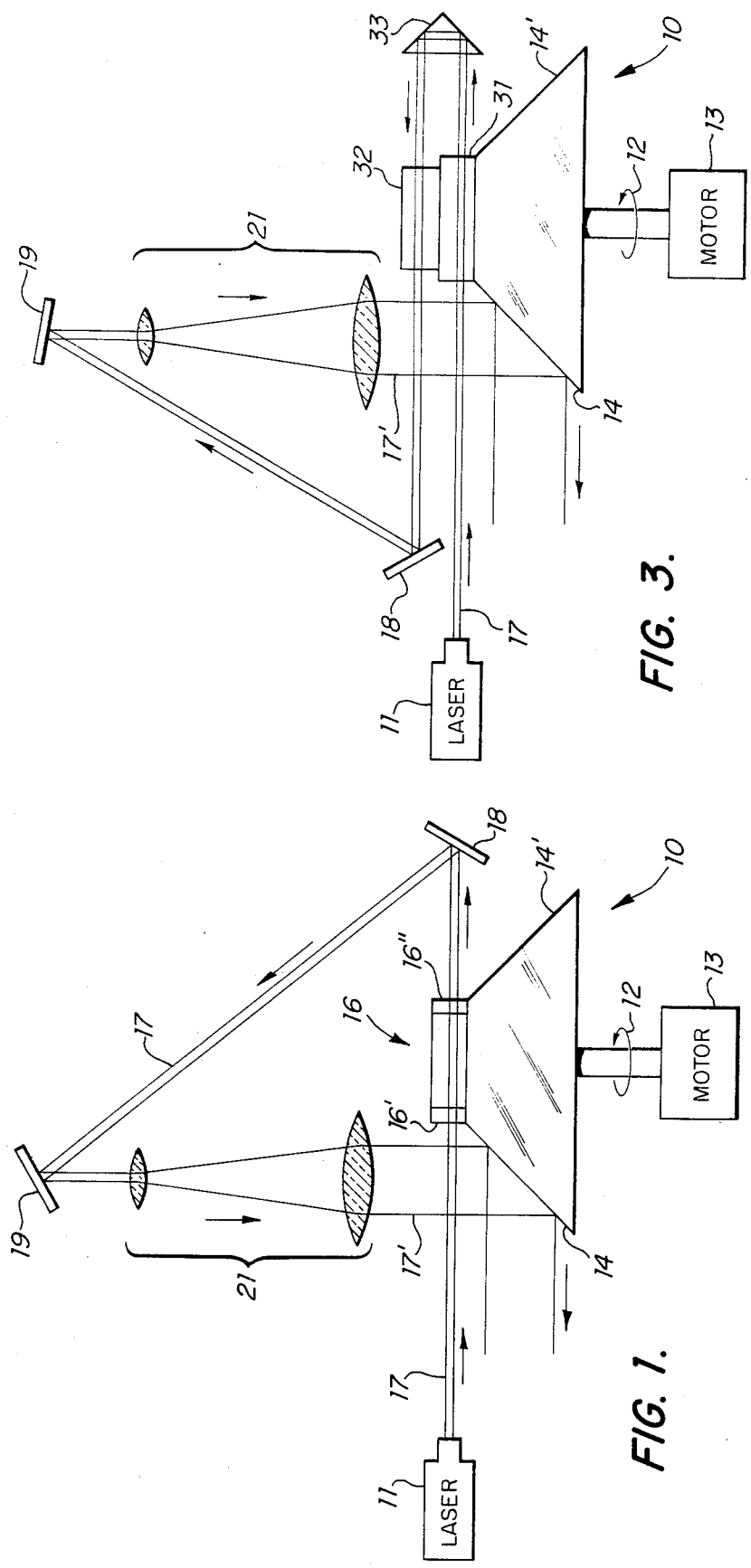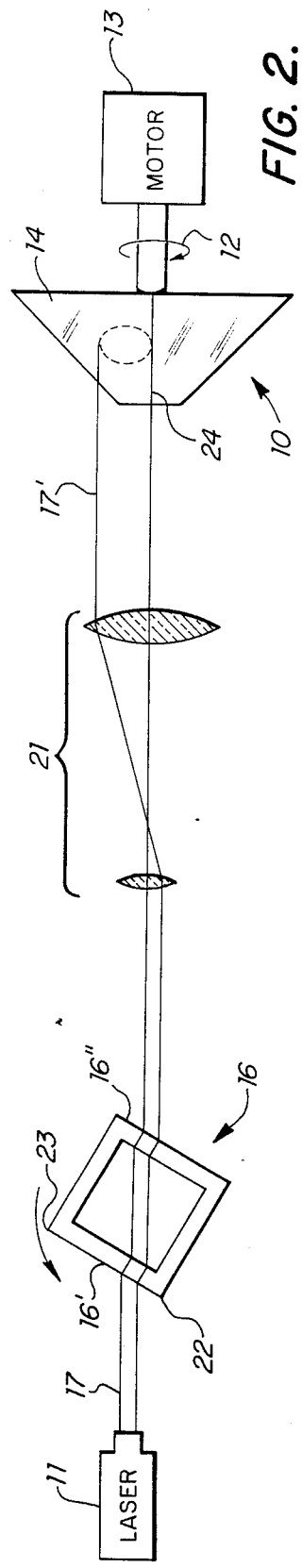

LASER SCANNING APPARATUS

BACKGROUND OF THE INVENTION

1. Field of the Invention

The present invention relates generally to an improved light scanning system, and, more particularly, to a high efficiency, high duty cycle laser scanning mechanism.

2. Description of the Prior Art

In laser scanning mechanisms utilizing multi-faceted pyramidal or polygonal laser beam deflectors, one of two scanning procedures is generally used. In the first case, the laser beam is adjusted to have a smaller cross-sectional area than the deflecting facet or face. With such an arrangement (termed underfilled) all of the laser power is available for use during the scanning operation; however, a facet changeover problem exists because the beam cannot be effectively used during the time that a facet intersection is passing through the beam. Thus, the duty cycle of the scanner becomes severely limited unless very large facets are used, and this is often impracticable.

In the second case the laser beam is made larger than the facet of the deflector and, in fact, is spread so as to cover at least two facets simultaneously. With this construction (termed overfilled) there is no facet changeover problem and a high duty cycle is obtainable. However, by spreading out the laser beam in this way, a considerable fraction of the available laser power is not available for use, and this is unacceptable in many applications.

SUMMARY OF THE PREFERRED EMBODIMENTS

In accordance with the present invention, the aboveedescribed inadequacies of the prior art have been significantly reduced by providing a system which maintains a very high duty cycle without any significant sacrifice in laser power transferred by the scanner. In accordance with the preferred embodiments, these improved characteristics are attained by introducing into a scanning system operating in a slightly underfilled condition, appropriate shifting structure for causing the laser beam to follow a deflecting facet as it moves such that the beam will remain fully on the facet for a substantially increased length of time. This shifting structure preferably comprises shearing means associated with each of the deflector faces and positioned in the path of the laser beam in advance of the deflector for shearing the beam to positions parallel to itself by amounts sufficient to maintain it fully on the deflector face for a substantial period of time, and, in addition, for allowing the beam to very rapidly jump from one facet to the next to initiate the next scanning cycle.

The shearing structure utilized can take anyone of several forms. In one preferred embodiment, it comprises a plurality of parallel glass plates corresponding in number to the number of faces on the deflector and rotatable with the deflector to vary the amount of shear as the deflector rotates. In an alternative embodiment, polygonal prisms are used to introduce the required amount of shear. With either embodiment, by making the laser beam quite narrow, as the shearing structure rotates, the edges between shear plates will proportionally take very little time to cross the beam, and, thus, the beam will quickly jump from one facet of the deflector to the next.

With the above-described structure, duty cycles in excess of 90 percent are readily possible without any significant loss in available laser energy. This compares to typical underfilled systems in which a duty cycle of only about 45 percent is not uncommon.

The structure needed to practice the present invention is relatively inexpensive and will not significantly add to the overall cost of the scanning mechanism and can be utilized in any application in which scanning is needed or desired such as product testing, graphics and the like.

Further advantages and features of the invention will be set forth in detail hereinafter in conjunction with the detailed description of the preferred embodiments.

BRIEF DESCRIPTION OF THE DRAWINGS

FIG. 1 schematically illustrates a laser scanner in accordance with a presently preferred embodiment of the present invention.

FIG. 2 illustrates an unfolded view of the system of FIG. 1 to assist in explaining the invention.

FIG. 3 schematically illustrates an alternative embodiment of the invention.

DETAILED DESCRIPTION OF THE PREFERRED EMBODIMENTS

FIG. 1 illustrates, somewhat schematically, a laser scanner in accordance with a presently preferred embodiment of the invention. The system includes a multi-faceted pyramidal deflector 10 of conventional construction positioned in the path of a laser beam directed thereto from a conventional laser source 11. As is well understood by those skilled in the art, deflector 10 is adapted to be rapidly rotated in the direction indicated by arrow 12 by a suitable motor 13, and as it is rotated, the faces thereon (e.g., face 14) will be carried across the beam and the beam will be reflected off of these faces to effect scanning. It should be apparent that during the movement of a particular face or facet across the laser beam, the beam will remain fully on that facet for only a limited period of time. During other periods the edge between adjacent facets will be in the process of crossing the beam and, during these times, only a portion of the beam, and hence, only a portion of the available laser energy will be available for scanning. At least for many applications, the scanner cannot be used during these periods, and this significantly limits the system's efficiency. For example, many typical systems have duty cycles of only about 45 percent.

Although the duty cycle of a scanner can be increased by making the facets very large or by expanding the beam so that is will cover two facets simultaneously, these are not fully satisfactory solutions as described previously.

The present invention has overcome this deficiency of the prior art by incorporating additional structure into the scanning system to cause the light beam to shift and follow a particular facet as it moves so that the beam will remain fully on the facet for an extended period of time. This structure, according to the embodiment of FIGS. 1 and 2 comprises a plurality of shear plates generally designated by reference number 16. These shear plates, which may be of plastic, glass or other transparent material having parallel faces, are equal in number to the number of facets on the deflector, and are adapted to be aligned with each of the deflector faces and to rotate in synchronism with them. Specifically, in the embodiment illustrated in FIG. 1 wherein a four-sided pyramidal deflector is employed, there are four separate shear plates. For other deflectors, a different number of plates will be employed, however, in the system of FIG. 1, a deflector having an even number of faces should be used so that opposing plates will always be parallel to one another. Because it is essential that the shear plate system 16 remain aligned with and rotate substantially in synchronism with deflector 10, it is preferable to physically attach them to the deflector as shown in FIG. 1.

The manner in which the system so far described is effective in improving the efficiency of the scanner will now be described in conjunction with FIGS. 1 and 2, FIG. 2 being an unfolded view of the path followed by the laser beam 17 through the scanning system. Initially, the beam 17 exiting from laser source 11 is passed through the shear plate system 16. During this time, the beam is in an unexpanded condition, and, in fact, it is preferable to maintain it at as small a cross-sectional diameter as practicable and optics may be incorporated in the path of the beam to accomplish this, if desired.

After passing through the shear plates the sheared beam is then directed by means of mirrors 18 and 19 through beam expanding optical system 21 which expands the beam to the diameter desired for the scanning operation. The expanded beam 17' is then directed to the deflector where it reflects off of the particular facet 14 in its path to be scanned.

From FIG. 2, it should be apparent that as the deflector 10 and the shear plate system 16 are rotating, beam 17 will pass through opposing plates 16' and 16'' and each plate will shear the beam by an amount which will be a function of the angle of the plates relative to the beam, the thickness of the plates, and their index of refraction. By properly adjusting the thickness and index of the plates, the amount of shear can be controlled to maintain the beam on a particular deflector face (e.g., face 14) for an increased length of time as the face moves across the beam. Specifically, as shown in FIG. 2, when the beam has just crossed the forward corner 22 of face 16', it will be sheared downwardly by plates 16' and 16'' by a maximum amount because these plates are at their maximum angle relative to the beam. The beam expanding optical system 21, however, will invert the beam upwardly to ensure that it falls fully on deflector face 14 and not on corner 24. As the plates 16 and the deflector face 14 rotates downwardly, the amount of shear will decrease to cause the beam (after inversion) to also move downwardly. As the plates continue to rotate, they will eventually begin to shear the beam in the opposite direction, i.e., upwardly in FIG. 2, but optical system will again invert the beam to cause it to continue to move downwardly in substantial synchronism with face 14 and remain fully on it.

When the beam finally reaches corner 23 of the plates, it will, since the beam is quite narrow, rapidly jump across it and be in position to begin the next scan. In an ideal system, the plates 16' and 16'' should introduce into unexpanded beam 17 a maximum shear equal to the radius of beam 17 in each direction, i.e., a total shear of the beam by its own diameter. The resulting shear in expanded beam 17' will then be by its own diameter. This would retain the beam 17' on facet 14 for its full movement across the beam with the only down periods being when the beam jumps across the corners 22 and 23. Thus, with the shear plates, duty cycles in excess of 90 percent are readily obtainable. A lesser amount of shear would still produce significantly improved results, however.

FIG. 3 illustrates an alternative embodiment of the invention in which polygonal prisms are used to introduce the required amount of shear instead of parallel plates. These might be desirable in those applications wherein the deflector is given a very high rotation rate because this might tend to deform the plates. The structure of the scanning system is similar to that of FIGS. 1 and 2 except that prisms are employed instead of plates and like components are identified by the same reference numbers.

The incoming laser beam 17 is directed through a first prism 31 which, since a four faced deflector is used, will also have four sides and thus be a solid square prism having parallel faces. Because the prism is solid, however, it will tend to introduce too much shear, and, therefore, the beam must also be passed through a second smaller prism 32 to eliminate some of the shear introduced by prism 31. This is conveniently accomplished by mounting the prisms one on top of the other and providing right angled prism reflector 33 to return beam 17 through prism 32. After passing through both prisms, the beam will be directed onto the deflector faces as before via mirrors 18 and 19 and beam expanding optics 21.

In operation, the prisms will act to shear beam 17 in a manner identical to that of the plates 16 of FIGS. 1 and 2.

In a specific application of the invention, an unexpanded beam of one millimeter diameter and an eight-sided plate system of about two inches in diameter (utilized with an eightsided deflector) will provide a duty cycle of about 90 percent.

Although what has been described are presently preferred embodiments of the invention, it should be apparent that many additions, modifications and omissions may be made without departing from the scope thereof. For example, although the systems described above employ pyramidal deflectors, with minor modifications, the present invention is equally applicable to polygonal scanners. Because the invention can take many other forms, it should be understood that it should be limited only insofar as required by the scope of the following claims.

I claim:

1. In a light scanning apparatus including:
   a. means for producing a light beam;
   b. beam deflector means positioned in the path of said light beam, said beam deflector means having at least one beam deflecting face; and,
   c. drive means for moving said beam deflecting face of said beam deflector means across said light beam to effect the scanning thereof; the improvement comprising:
   d. shifting means for shifting said light beam in conjunction with the movement of said beam deflecting face for maintaining a substantial portion of said light beam on said beam deflecting face for an increased length of time as said face is moved across said beam.

2. Apparatus as recited in claim 1 wherein said shifting means comprises shearing means positioned in the path of said light beam in advance of said deflector means for shifting said beam parallel to itself and in the direction of movement of said deflecting face.

3. Apparatus as recited in claim 2 wherein said shearing means shears said beam in substantial synchronism with the movement of said deflecting face so that said beam will substantially follow said moving face.

4. Apparatus as recited in claim 2 wherein said shearing means includes means coupled to said deflector means for movement therewith.

5. Apparatus as recited in claim 4 wherein said means for producing said light beam comprises a laser.

6. Apparatus as recited in claim 1 wherein:
   a. said beam deflector means has a plurality of beam deflecting faces;
   b. said drive means comprises means for rotating said beam deflector means for sequentially moving said plurality of faces across said light beam for effecting sequential scanning thereof; and wherein
   c. said shifting means comprises means for shifting said light beam in conjunction with the movement of each of said beam deflecting faces across said beam for maintaining a substantial portion of said light beam on each of said faces for an increased length of time as each of said faces is moved thereacross.

7. Apparatus as recited in claim 6 wherein said shifting means comprises shearing means for shearing said beam to positions parallel to itself and in the direction of movement of said faces across said beam.

8. Apparatus as recited in claim 7 wherein said shearing means is positioned in the path of said light beam in advance of said deflector means.

9. Apparatus as recited in claim 8 wherein said shearing means comprises a plurality of transparent shear plates.

10. Apparatus as recited in claim 9 wherein said plurality of shear plates are coupled to said deflector means for rotation therewith and wherein said apparatus further includes beam directing means for directing said sheared beam to said deflecting faces.

11. Apparatus as recited in claim 9 wherein said shearing means comprises prism means.

12. Apparatus as recited in claim 11 wherein said prism means are coupled to said deflector means for rotation therewith and wherein said apparatus further includes beam directing means for directing said sheared beam to said deflecting faces.

13. Apparatus as recited in claim 10 wherein said deflector means has an even number of deflecting faces and wherein said plurality of shear plates are equal in number to said number of deflecting faces.

14. Apparatus as recited in claim 6 wherein said means for producing said light beam comprises a laser.

* * * * *